(12) United States Patent
Fullerton et al.

(10) Patent No.: US 7,961,068 B2
(45) Date of Patent: Jun. 14, 2011

(54) CORRELATED MAGNETIC BREAKAWAY DEVICE AND METHOD

(75) Inventors: Larry W. Fullerton, New Hope, AL (US); Mark D. Roberts, Hunstville, AL (US); Mitchell Williams, Madison, AL (US)

(73) Assignee: Cedar Ridge Research, LLC., New Hope, AL (US)

( * ) Notice: Subject to any disclaimer, the term of this patent is extended or adjusted under 35 U.S.C. 154(b) by 0 days.

(21) Appl. No.: 12/894,837

(22) Filed: Sep. 30, 2010

(65) Prior Publication Data
US 2011/0018663 A1    Jan. 27, 2011

Related U.S. Application Data

(63) Continuation-in-part of application No. 12/476,952, filed on Jun. 2, 2009.

(60) Provisional application No. 61/247,783, filed on Oct. 1, 2009.

(51) Int. Cl.
*H01F 7/02* (2006.01)

(52) U.S. Cl. ........ 335/306; 335/285; 114/127; 114/162; 248/548; 440/56

(58) Field of Classification Search ....... 114/127–144 E; 440/56; 248/548, 640–643; 335/285, 306
See application file for complete search history.

(56) References Cited

U.S. PATENT DOCUMENTS

| 381,968 | A | 5/1888 | N. Tesla |
| 493,858 | A | 3/1893 | Edison |
| 996,933 | A | 7/1911 | Lindquist |
| 1,236,234 | A | 8/1917 | Troje |
| 2,389,298 | A | 11/1945 | Ellis |
| 2,570,625 | A | 10/1951 | Zimmerman et al. |
| 2,722,617 | A | 11/1955 | Cluwen et al. |
| 2,932,545 | A | 4/1960 | Foley |
| 3,102,314 | A | 9/1963 | Alderfer |
| 3,208,296 | A | 9/1965 | Baermann |
| 3,288,511 | A | 11/1966 | Tavano |
| 3,468,576 | A | 9/1969 | Beyer et al. |

(Continued)

FOREIGN PATENT DOCUMENTS

AU    2008100473 A4 *    6/2008

(Continued)

OTHER PUBLICATIONS

"BNS Series-Compatible Series AES Safety Controllers"pp. 1-17, http://www.schmersalusa.com/safety_controllers/drawings/aes.pdf (downloaded on or before Jan. 23, 2009).

(Continued)

*Primary Examiner* — Ramon M Barrera
(74) *Attorney, Agent, or Firm* — George P. Kobler; William J. Tucker

(57) ABSTRACT

A breakaway device for locking connected objects in relation to one another comprises a first magnetic field structure attached to a first object and a second magnetic field structure attached to a second object. The first magnetic field structure becoming attached to the second magnetic field structure when substantially aligned. The first structure and the second structure becoming detached when subjected to a force that overcomes a spatial force between the first magnetic field structure and the second magnetic field structure. The first magnetic field structure and the second magnetic field structure having magnetic field sources with polarities and positions in accordance with a code corresponding to a desired spatial force function.

18 Claims, 19 Drawing Sheets

U.S. PATENT DOCUMENTS

| | | |
|---|---|---|
| 3,474,366 A | 10/1969 | Barney |
| 3,802,034 A | 4/1974 | Bookless |
| 4,079,558 A | 3/1978 | Gorham |
| 4,222,489 A | 9/1980 | Hutter |
| 4,453,294 A | 6/1984 | Morita |
| 4,547,756 A | 10/1985 | Miller et al. |
| 4,629,131 A | 12/1986 | Podell |
| 4,941,236 A | 7/1990 | Sherman |
| 5,050,276 A | 9/1991 | Pemberton |
| 5,367,891 A | 11/1994 | Furuyama |
| 5,383,049 A | 1/1995 | Carr |
| 5,631,093 A | 5/1997 | Perry et al. |
| 5,631,618 A | 5/1997 | Trumper et al. |
| 5,956,778 A | 9/1999 | Godoy |
| 5,983,406 A | 11/1999 | Meyerrose |
| 6,072,251 A | 6/2000 | Markle |
| 6,115,849 A | 9/2000 | Meyerrose |
| 6,170,131 B1 | 1/2001 | Shin |
| 6,275,778 B1 | 8/2001 | Shimada et al. |
| 6,457,179 B1 | 10/2002 | Prendergast |
| 6,607,304 B1 | 8/2003 | Lake et al. |
| 6,720,698 B2 | 4/2004 | Galbraith |
| 6,847,134 B2 | 1/2005 | Frissen et al. |
| 6,862,748 B2 | 3/2005 | Prendergast |
| 6,927,657 B1 | 8/2005 | Wu |
| 6,971,147 B2 | 12/2005 | Halstead |
| 7,066,778 B2 | 6/2006 | Kretzschmar |
| 7,362,018 B1 | 4/2008 | Kulogo et al. |
| 7,444,683 B2 | 11/2008 | Prendergast et al. |
| 2004/0003487 A1 | 1/2004 | Reiter |
| 2006/0066428 A1 | 3/2006 | McCarthy et al. |
| 2006/0189259 A1 | 8/2006 | Park |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |

FOREIGN PATENT DOCUMENTS

| | | |
|---|---|---|
| FR | 823395 | 1/1938 |
| WO | 2007081830 A2 | 7/2007 |

OTHER PUBLICATIONS

"Magnetic Safety Sensors" pp. 1-3, http://farnell.com/datasheets/6465.pdf (downloaded on or before Jan. 23, 2009).

"Series BNS-820 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).

* cited by examiner

FIG. 3A

FIG. 3B
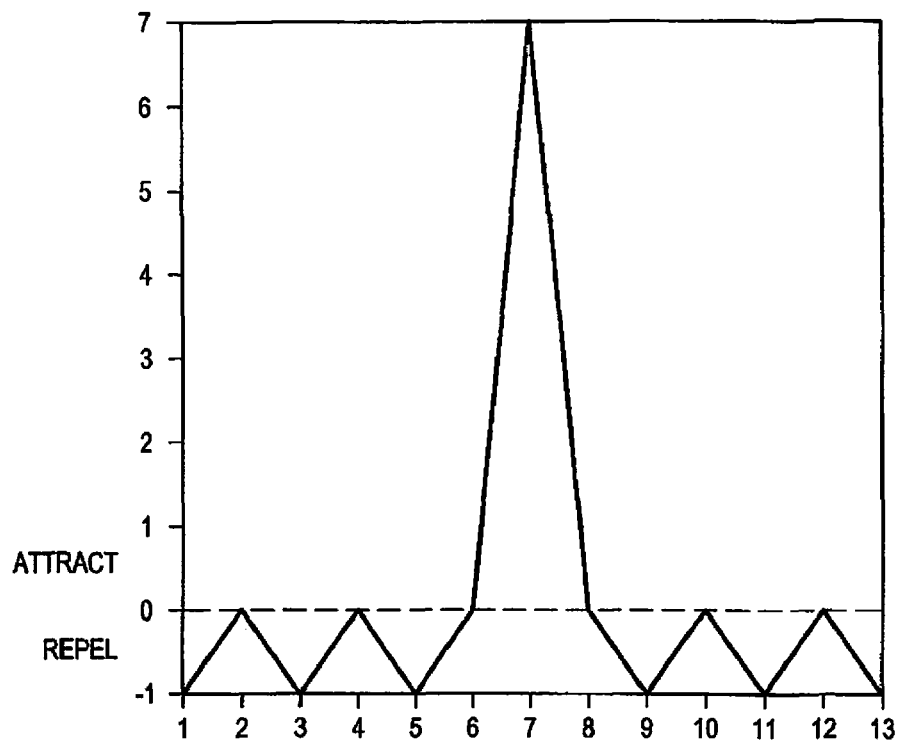
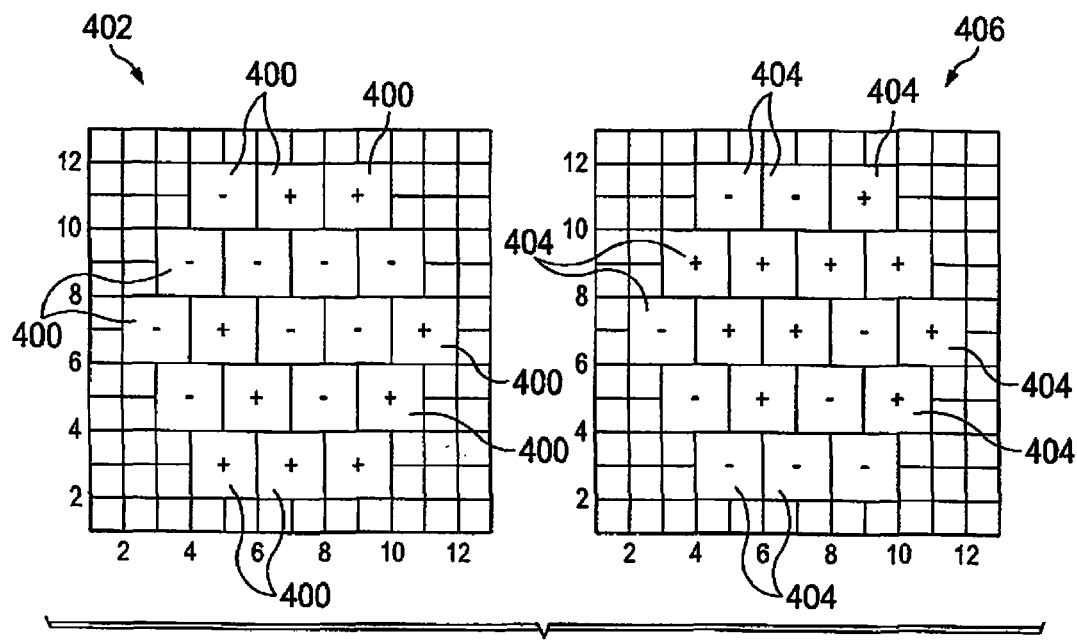
FIG. 4A

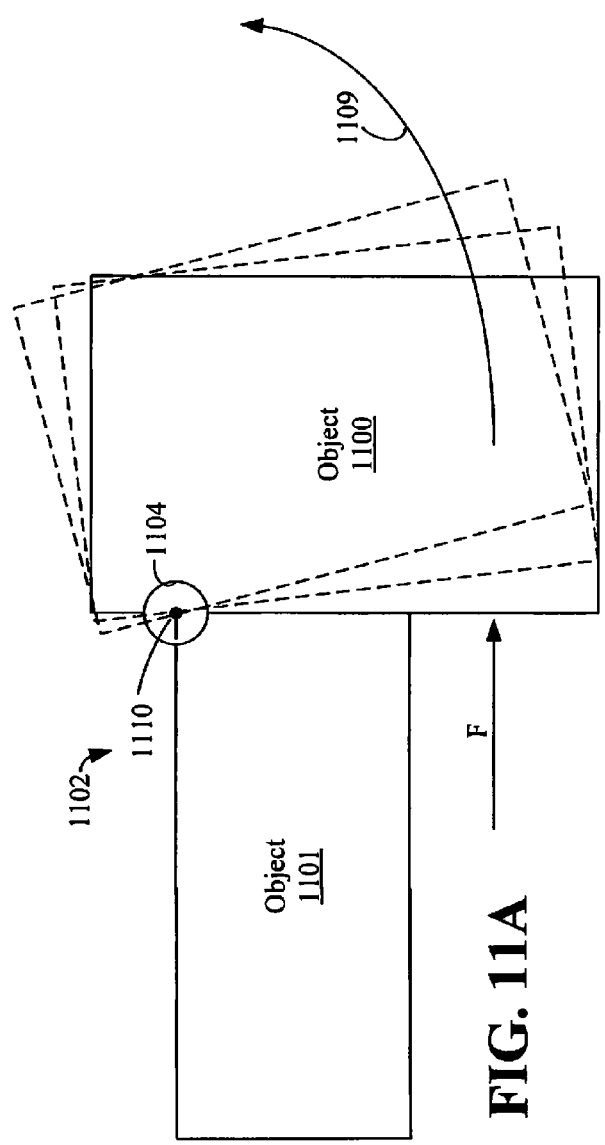
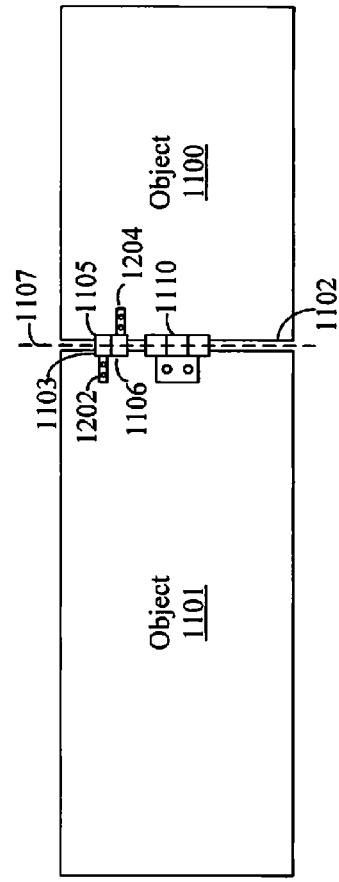
FIG. 11A
FIG. 11B

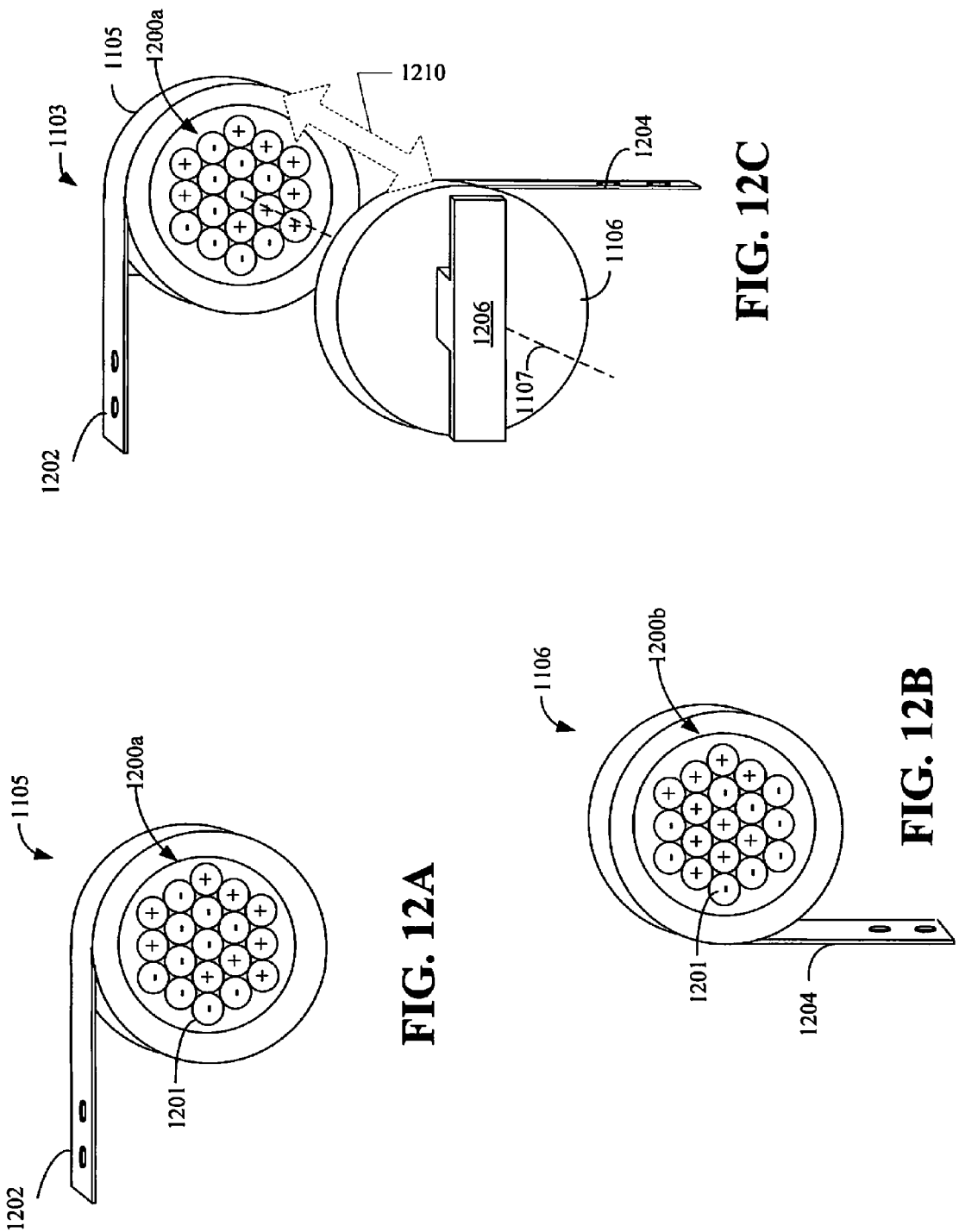

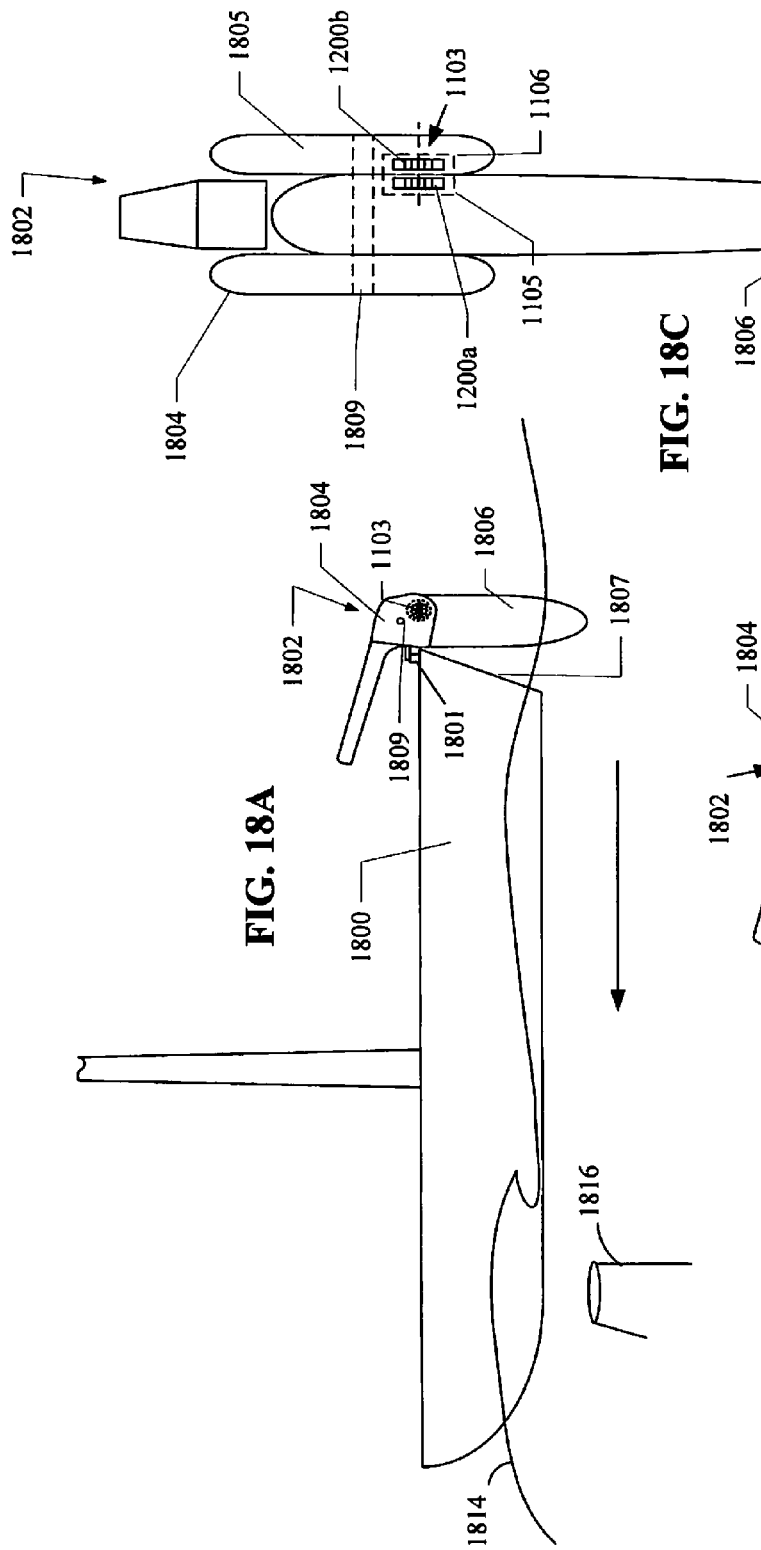
FIG. 18A
FIG. 18B
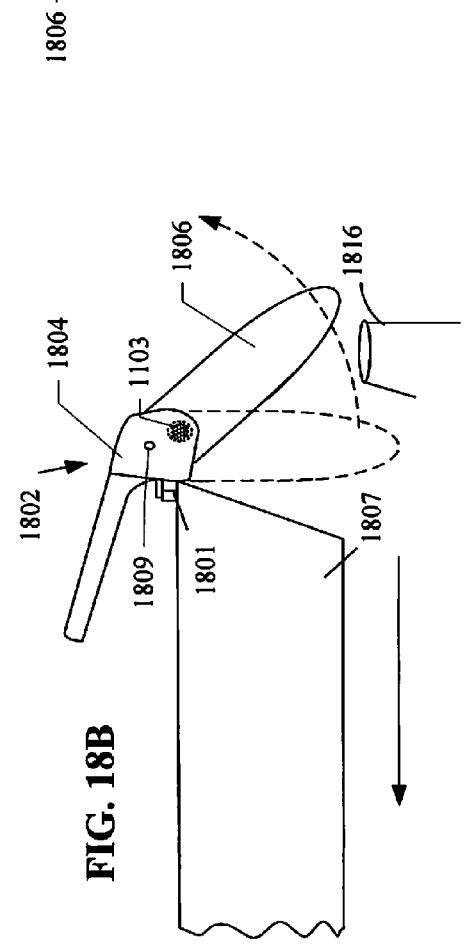
FIG. 18C

CORRELATED MAGNETIC BREAKAWAY DEVICE AND METHOD

CLAIMING BENEFIT OF PRIOR FILED U.S. APPLICATION

This patent application claims the benefit of U.S. Provisional Application Ser. No. 61/247,783, filed Oct. 1, 2009, and entitled "Correlated Magnetic Breakaway Device and Method". The contents of this document are hereby incorporated by reference herein.

CROSS REFERENCE TO RELATED APPLICATIONS

This patent application is a continuation-in-part to U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

FIELD

The present disclosure relates to breakaway devices. In particular, the present disclosure relates to a breakaway device used on an outboard motor and a rudder of a boat.

BACKGROUND

Oftentimes, two objects are coupled together during operation. For example, a boat and an outboard motor are coupled together while the boat is being propelled through the water by the outboard motor. However, there may be times during operation that one of the objects, e.g., the outboard motor, strikes another object, thereby causing damage to the outboard motor, the boat, or both.

As another example, a rudder, which may be an outboard rudder or an inboard rudder, is attached to a boat. With respect to an outboard rudder that is coupled underneath a boat, oftentimes, the rudder may strike another object in the water, thereby causing damage to the rudder, the boat, or both.

SUMMARY

A system for attaching and detaching two objects in accordance with one embodiment of the present disclosure comprises a first magnetic field structure attached to a first object and a second magnetic field structure attached to a second object. The first magnetic field structure attaches to the second magnetic field structure when substantially aligned and the first structure and the second structure becoming detached when subjected to a force that overcomes a spatial force between the first magnetic field structure and the second magnetic field structure. The first magnetic field structure and the second magnetic field structure having magnetic field sources having polarities and positions in accordance with a code corresponding to a desired spatial force function.

A breakaway system for an outboard motor in accordance with an embodiment of the present disclosure has a first magnetic field structure attached to a boat and a second magnetic field structure attached to an outboard motor that is coupled to the boat. The first magnetic field structure attaches to the second magnetic field structure when substantially aligned, and the first structure and the second structure detach when the outboard motor is subjected to a force that overcomes a spatial force between the first magnetic field structure and the second magnetic field structure. The first magnetic field structure and the second magnetic field structure have magnetic field sources exhibiting polarities and positions in accordance with a code corresponding to a desired spatial force function.

BRIEF DESCRIPTION OF THE DRAWINGS

The present invention is described with reference to the accompanying drawings. In the drawings, like reference numbers, and specifically, common last digit(s), indicate identical or functionally similar elements. Additionally, the left-most digit(s) of a reference number identifies the drawing in which the reference number first appears.

FIGS. 1-9 are various diagrams used to help explain different concepts about correlated magnetic technology which can be utilized in an embodiment of the present invention.

FIGS. 11A-11C depicts several views of two exemplary objects coupled together via a breakaway device in accordance with an embodiment of the present disclosure.

FIGS. 12A-12D depicts several views of the breakaway device shown in FIGS. 11A-11C in accordance with an embodiment of the present disclosure.

FIG. 18A-18C depicts a boat having a rudder connected thereto by the breakaway device shown in FIGS. 12A-12D in accordance with another embodiment of the present invention.

DETAILED DESCRIPTION

The various embodiments of the present invention and their advantages are best understood by referring to FIGS. 1 through 18 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Correlated Magnetics Technology

A new revolutionary technology called correlated magnetics was first fully described and enabled in the co-assigned U.S. patent application Ser. No. 12/123,718 filed on May 20, 2008 and entitled "A Field Emission System and Method", now U.S. Pat. No. 7,800,471, issued Sep. 21, 2010. The contents of this document are hereby incorporated herein by reference. A second generation of a correlated magnetic technology is described and enabled in the co-assigned U.S. patent application Ser. No. 12/358,423 filed on Jan. 23, 2009, and entitled "A Field Emission System and Method". The contents of this document are hereby incorporated herein by reference. A brief discussion about correlated magnetics is provided first before a detailed discussion is provided about the correlated magnetic assemblies for securing objects in water craft.

This section is provided to introduce the reader to basic magnets and the new and revolutionary correlated magnetic technology. This section includes subsections relating to basic magnets, correlated magnets, and correlated electromagnets. It should be understood that this section is provided to assist the reader with understanding the present invention, and should not be used to limit the scope of the present invention.

A. Magnets

Figure 1:
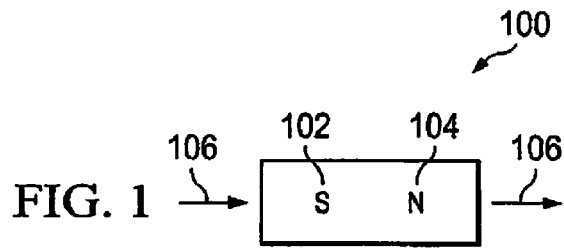

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
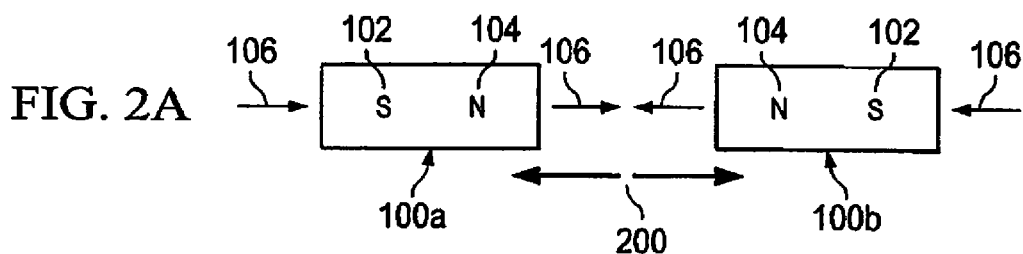
Figure 2B:
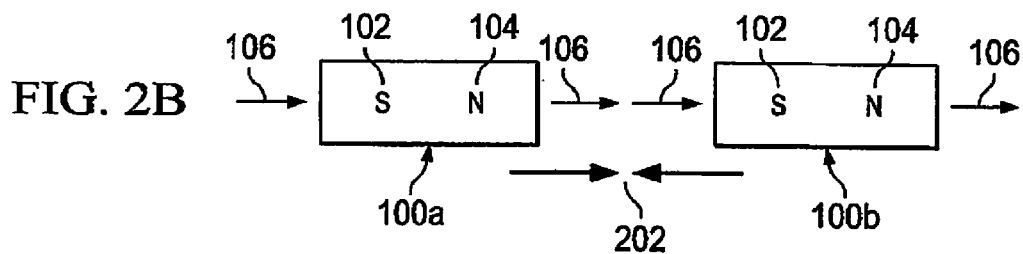
Figure 2C:
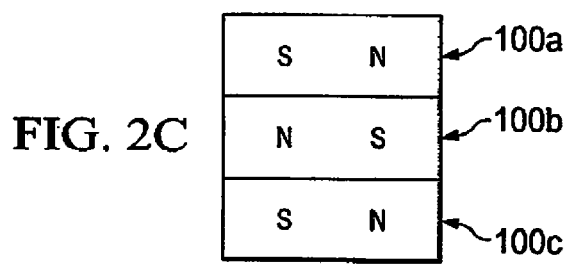

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems and radar systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, four dimensional codes, or combinations thereof, and so forth.

Generally, the spatial force functions of the present invention are in accordance with a code, where the code corresponding to a code modulo of first field emission sources and a complementary code modulo of second field emission sources. The code defines a peak spatial force corresponding to substantial alignment of the code modulo of the first field emission sources with the complementary code modulo of the second field emission sources. The code also defines a plurality of off peak spatial forces corresponding to a plurality of different misalignments of the code modulo of the first field emission sources and the complementary code modulo of the second field emission sources. The plurality of off peak spatial forces have a largest off peak spatial force, where the largest off peak spatial force is less than half of the peak spatial force.

Figure 3A:
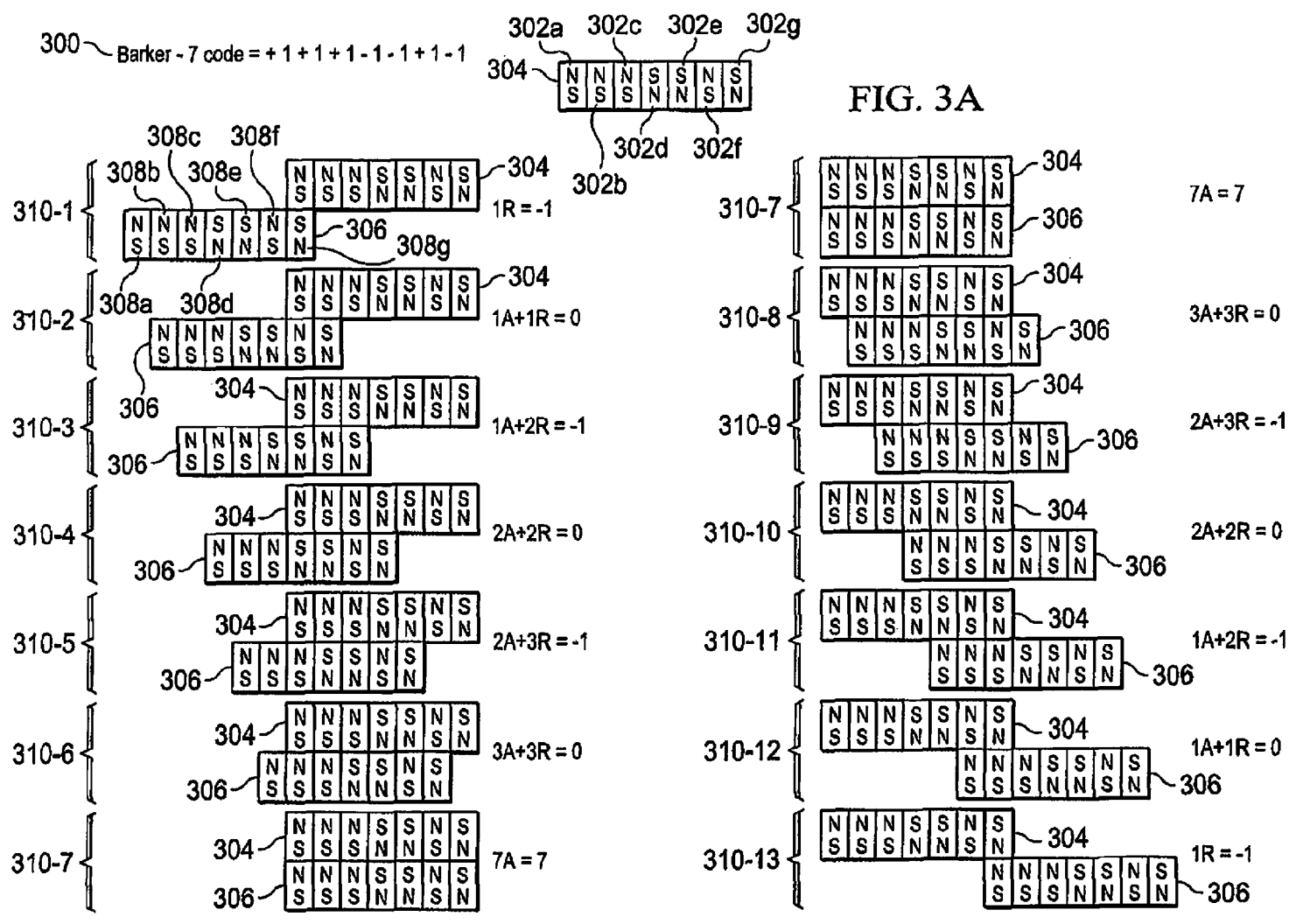

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4B:
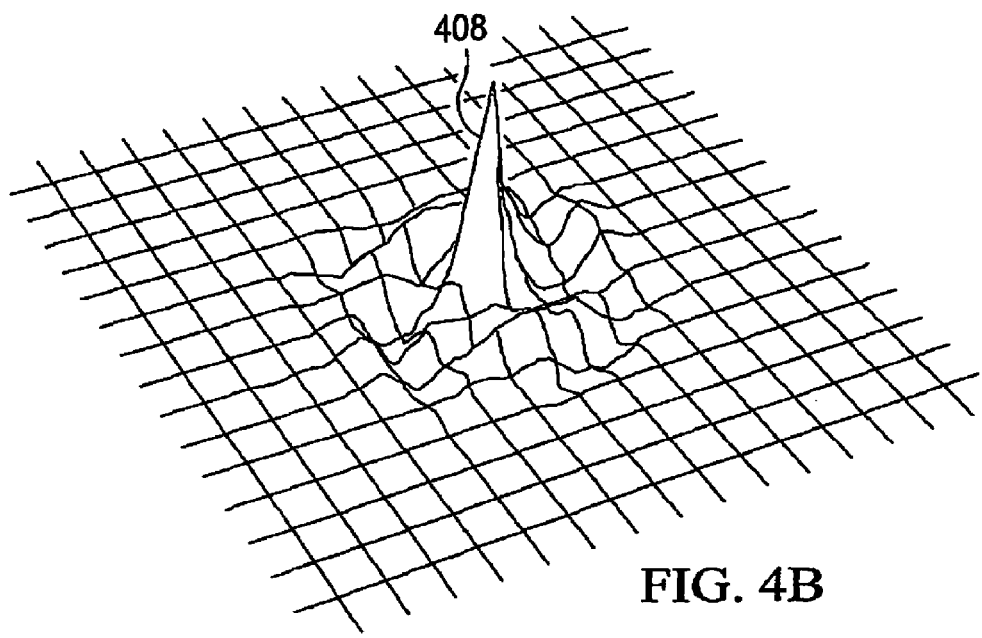
Figure 4C:
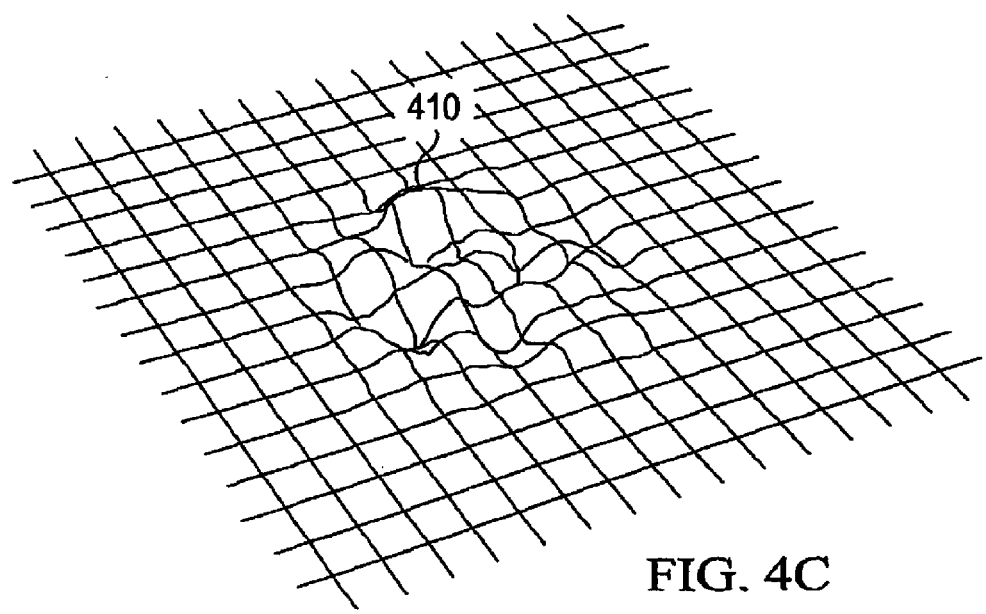

Referring to FIG. 4A, there is a diagram of an exemplary array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
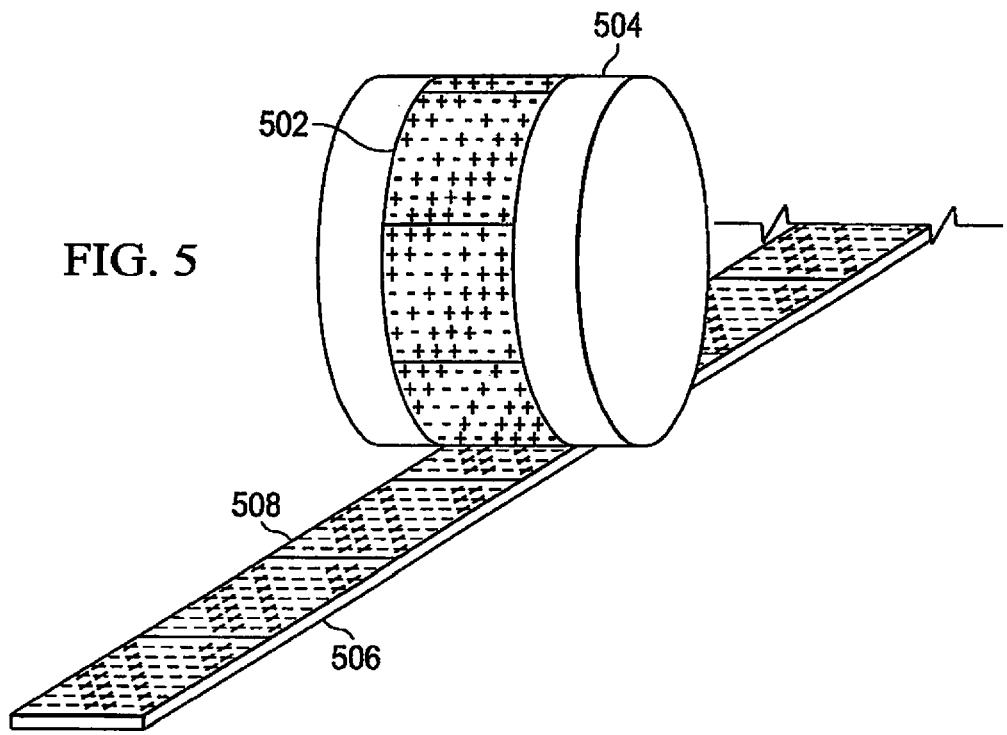

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
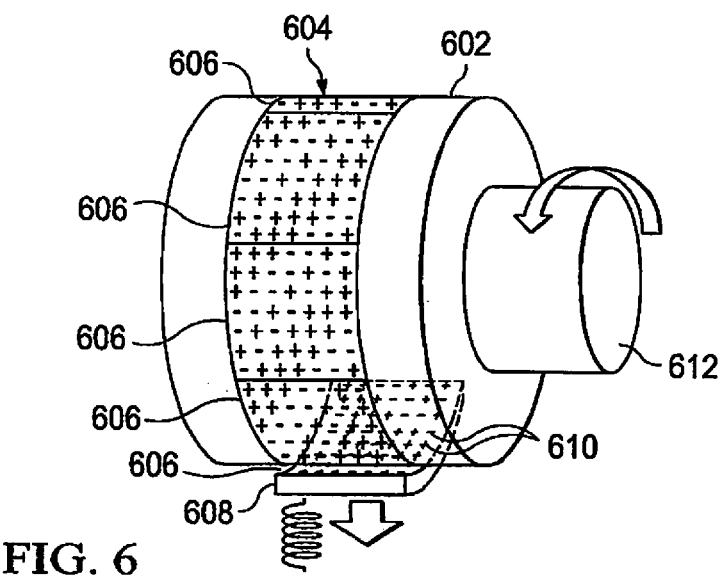

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort of holding mechanism to form different magnetic field emission structures which can be used in a wide-variety of applications like, for example, a drill head assembly, a hole cutting tool assembly, a machine press tool, a gripping apparatus, a slip ring mechanism, and a structural assembly. Moreover, magnetic field emission structures may include a turning mechanism, a tool insertion slot, alignment marks, a latch mechanism, a pivot mechanism, a swivel mechanism, or a lever.

C. Correlated Electromagnetics

Correlated magnets can entail the use of electromagnets, which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
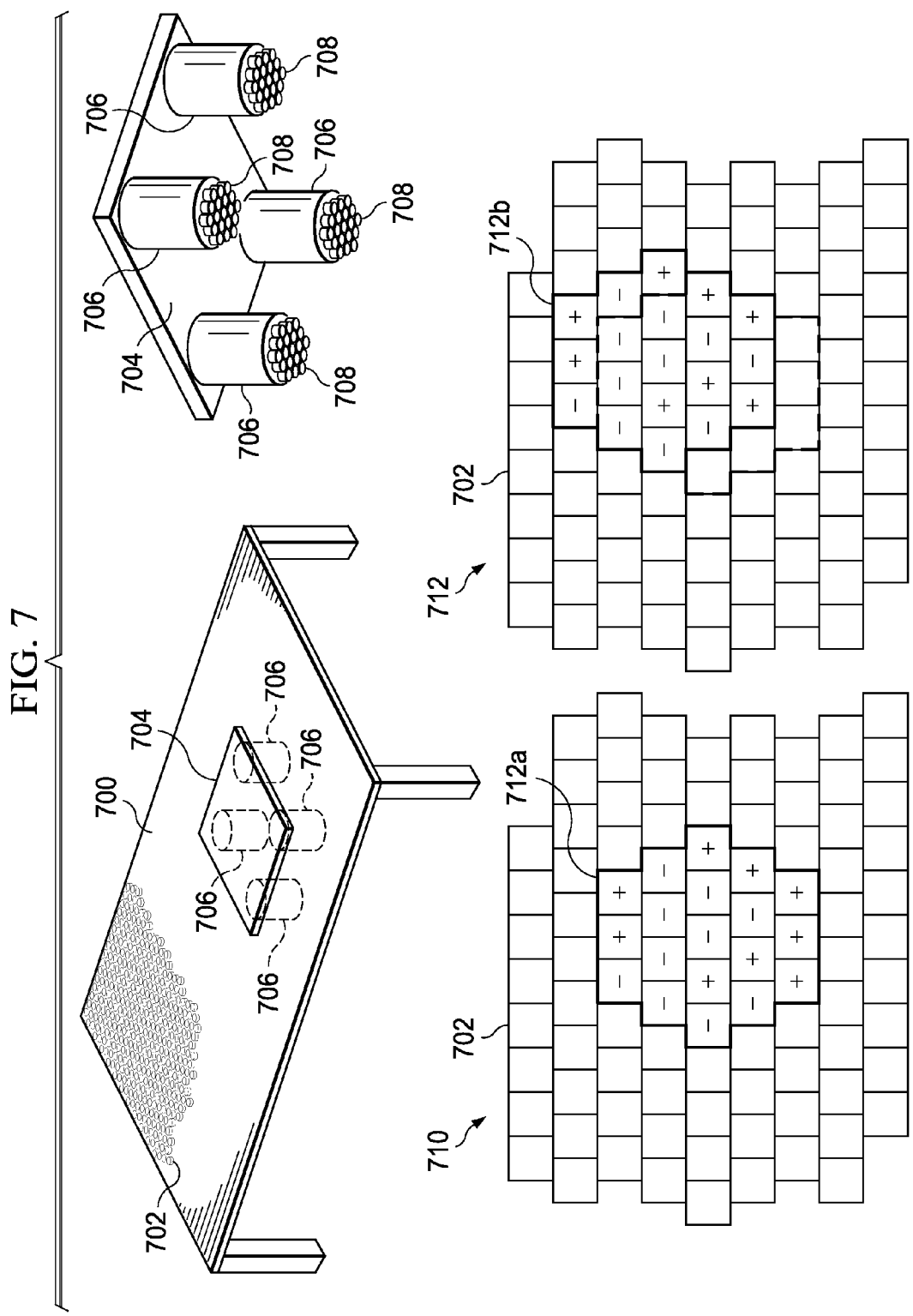

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnet array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
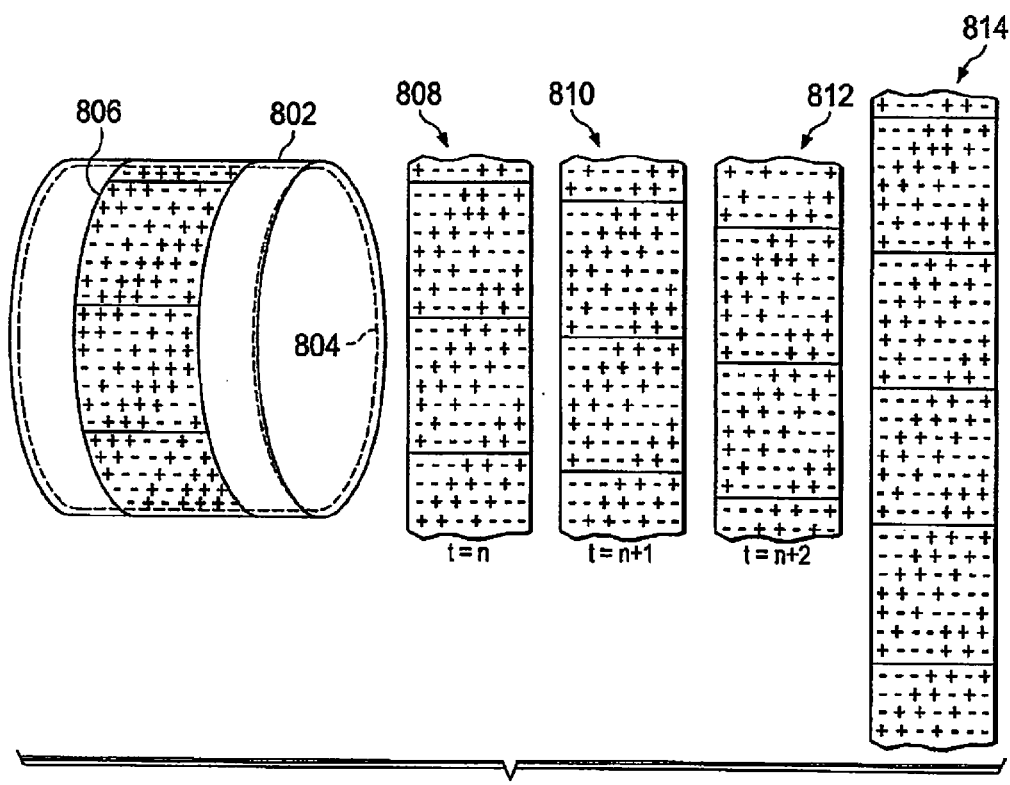

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
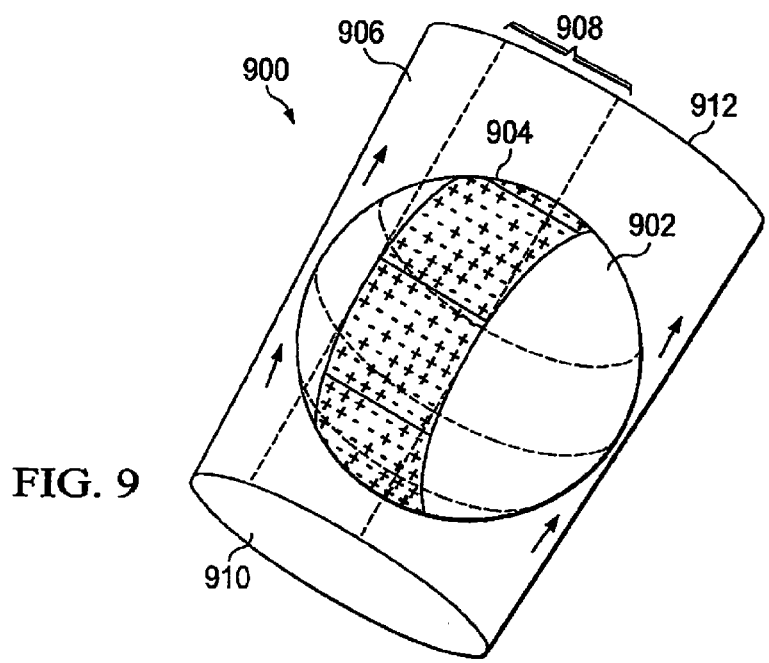

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, a-rings, and the like can be employed with the use of the correlated magnets. Plus, one skilled in the art will recognize that the magnetic field emission structures can have an array or sources including, for example, a permanent magnet, an electromagnet, an electret, a magnetized ferromagnetic material, a portion of a magnetized ferromagnetic material, a soft magnetic material, a superconductive magnetic material, or some combination thereof and so forth.

Figure 10B:
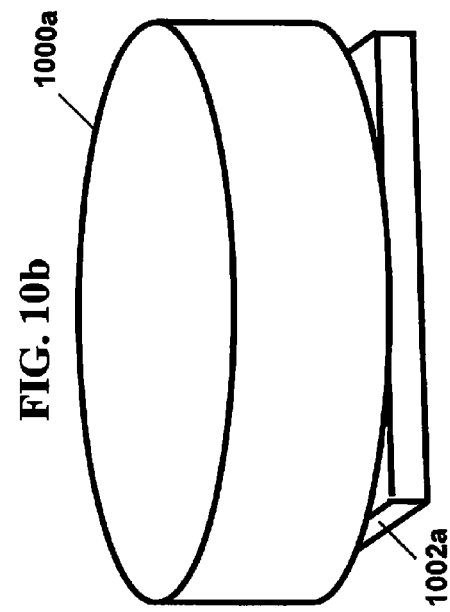
FIGS. 10A-10D depict an exemplary method of manufacturing magnetic field emission structures using a ferromagnetic (or antiferromagnetic) material; loom
Figure 10D:
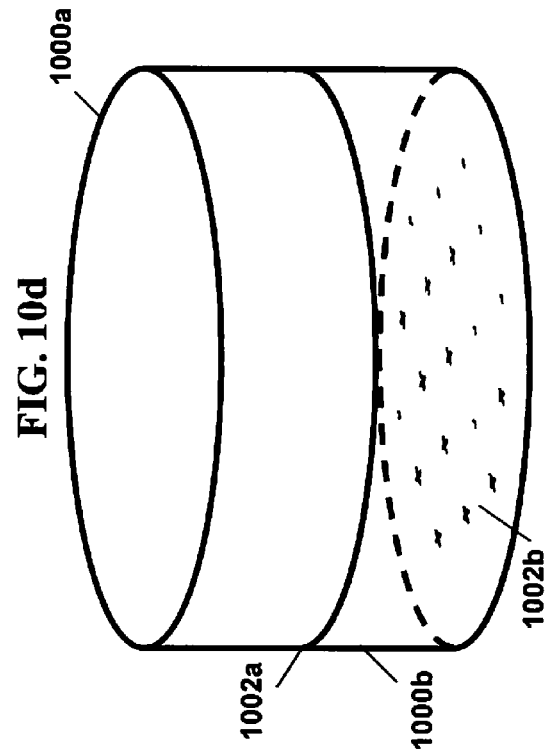
Figure 10A:
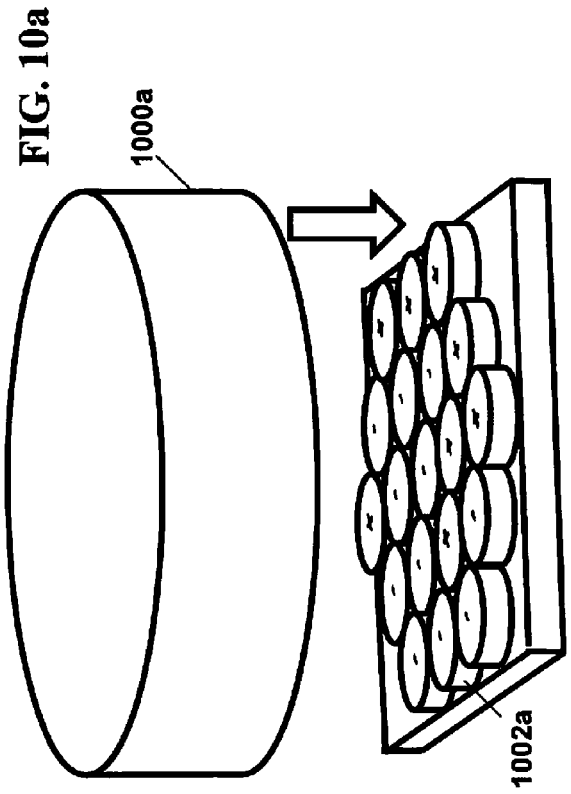
Figure 10C:
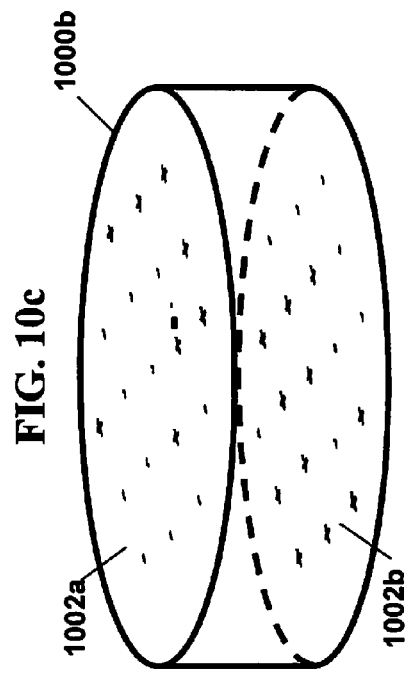
Figure 11C:
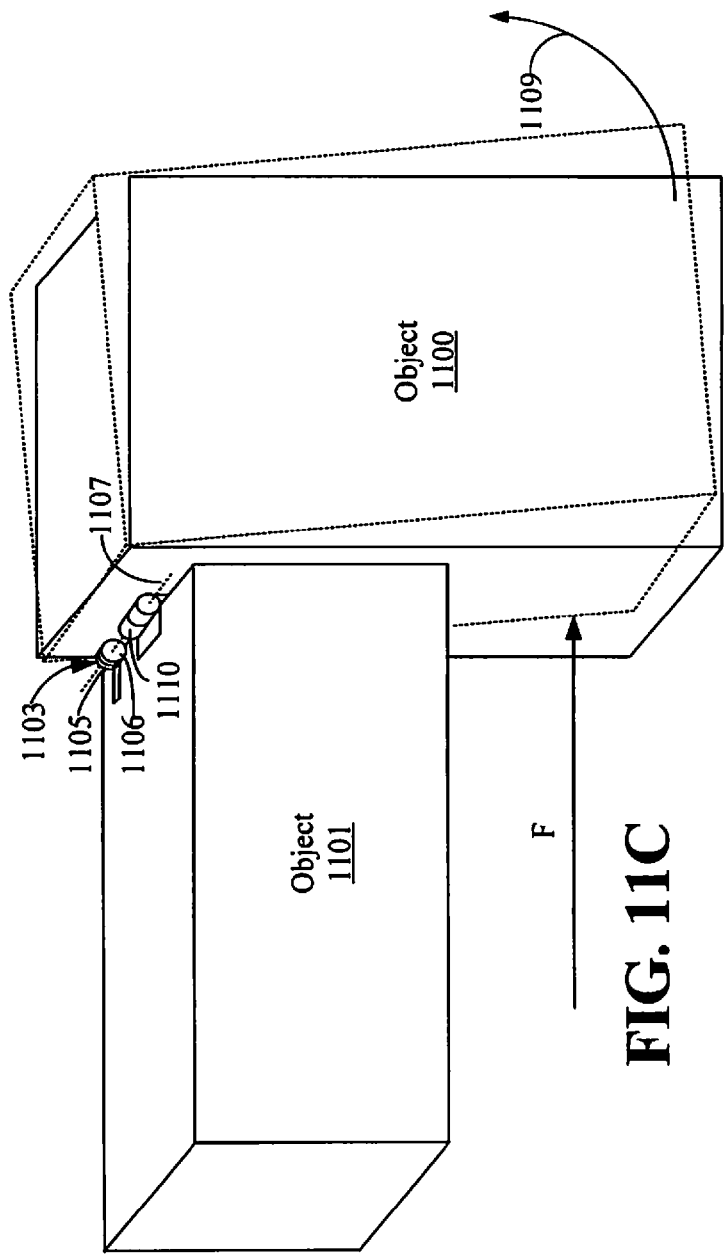

Forming Field Emission Structures With Ferromagnetic (Antiferromagnetic) Materials FIGS. 10a through 10d depict a manufacturing method for producing magnetic field emission structures. In FIG. 10a, a first magnetic field emission structure 1002a comprising an array of individual magnets is shown below a ferromagnetic material 1000a (e.g., iron) that is to become a second magnetic field emission structure having the same coding as the first magnetic field emission structure 1002a. In FIG. 10b, the ferromagnetic material 1000a has been heated to its Curie temperature (for antiferromagnetic materials this would instead be the Neel temperature). The ferromagnetic material 1000a is then brought in contact with the first magnetic field emission structure 1002a and allowed to cool. Thereafter, the ferromagnetic material 1000a takes on the same magnetic field emission structure properties of the first magnetic field emission structure 1002a and becomes a magnetized ferromagnetic material 1000b, which is itself a magnetic field emission structure, as shown in FIG. 10c. As depicted in FIG. 10d, should another ferromagnetic material 1000a be heated to its Curie temperature and then brought in contact with the magnetized ferromagnetic material 1000b, it too will take on the magnetic field emission structure properties of the magnetized ferromagnetic material 1000b as previously shown in FIG. 10c.

An alternative method of manufacturing a magnetic field emission structure from a ferromagnetic material would be to use one or more discrete high temperature heat sources, for example, lasers, or plasma, to selectively heat up field emission source locations on the ferromagnetic material to the Curie temperature and then subject the locations to a magnetic field. With this approach, the magnetic field to which a heated field emission source location may be subjected may have a constant polarity or have a polarity varied in time so as to code the respective source locations as they are heated and cooled.

Correlated Magnetic Breakaway Devices

FIGS. 11-12 depict another application of magnetic field emission structures in accordance with an embodiment of the present disclosure. An apparatus 1102 comprises a first object 1100 and a second object 1101. In such an embodiment, object 1100 is pivotally coupled to the object 1101 at a pivot point 1104, which is located near one end of the first object 1100, and through which an axis of rotation 1107 extends. The pivotal attachment of the objects 1100 and 1101 may be through, for example, a conventional hinge 1110 arrangement as is known in the art.

If a force F having a value greater than a threshold value acts upon the object 1100, torque is applied at the pivot point 1104, and the object 1100 moves upward, rotating about the axis of rotation 1107, and in a direction that follows the arc reference line 1109. Movement of the object 1100 with respect to the object 1101 is illustrated by the dotted lines outlining the object 1100 as it moves in response to a force F which exceeds the threshold value.

Figure 12D:
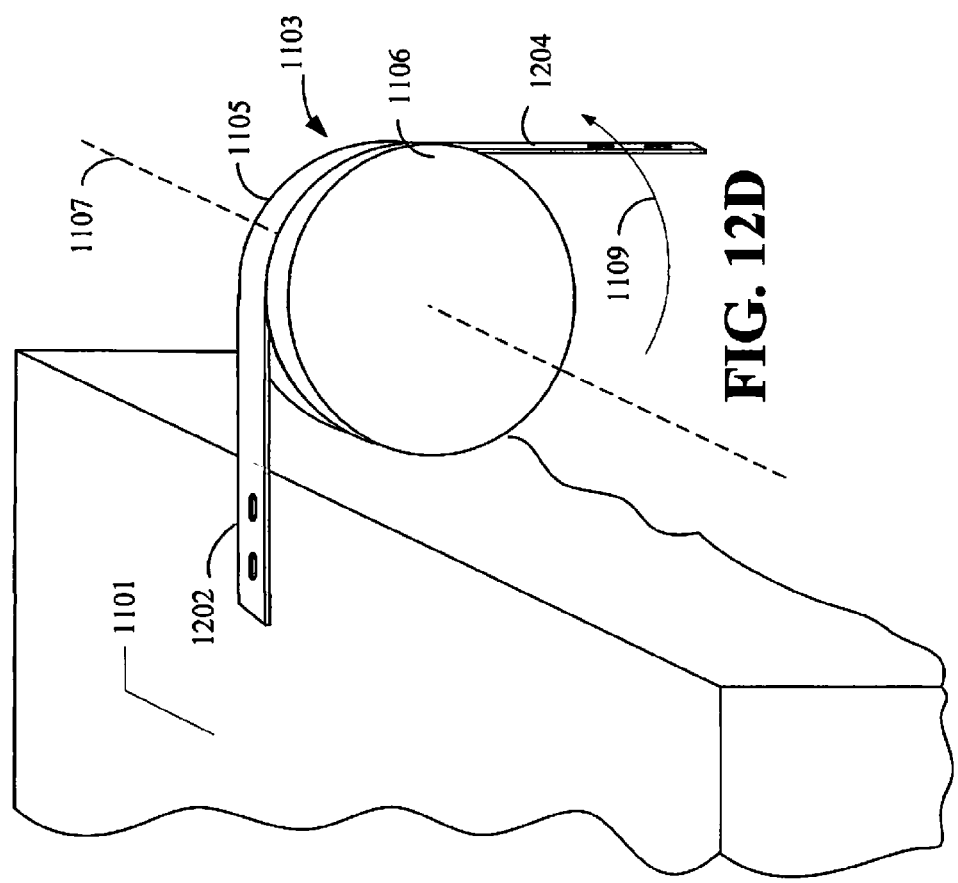

In addition, the apparatus 1102 further comprises a breakaway device 1103 shown in greater detail in FIGS. 12A through 12D. The breakaway device 1103 comprises a first half 1105 that is mounted to the object 1101 via a mounting plate 1202 which may be attached in any conventional manner. The first half 1105 comprises a first magnetic field emission structure 1200a. The breakaway device 1103 further comprises a second half 1106 attached to object 1100 via a mounting plate 1204 which may be attached in any conventional manner. The second half 1106 comprises a second magnetic field emission structure 1200b. FIG. 12C depicts an exploded view of the breakaway device 1103 illustrating the first half 1105 oriented perpendicular to the axis of rotation 1107 with the second half 1106 in a complementary, opposing position, i.e. horizontally reversed from the view shown in FIG. 12B.

In this implementation, magnetic field emission structures 1200a and 1200b may be any such structure described above which is configured to exhibit a spatial attracting force when such structures are placed into a mutually complementary orientation. As described above, magnetic field emission structures 1200a and 1200b each comprise an array of a plurality of distinct magnetic field emission sources 1201 having positions and polarities arranged according to a desired spatial force function. When the second magnetic field emission structure 1200b is brought into a certain complementary orientation with the first magnetic field emission structure 1200a, a peak spatial attracting force 1210 is generated in accordance with the spatial force function between the first and second magnetic field emission structures 1200a and 1200b, such that the two field emission structures 1200a and 1200b are strongly attracted to each other. The spatial force function according to which the first and second field emission structures 1200a and 1200b are arrayed is also configured such that spatial attracting force, decreases as the halves 1105 and 1106 become misaligned.

In this exemplary embodiment, the breakaway device 1103 is positioned on the axis of rotation 1107 of the pivoting connection 1104 and oriented so that magnetic field emission structures 1200a and 1200b lie in a plane perpendicular to the axis 1107 so that torque applied about the axis 1107 is also applied to the breakaway device 1103. The spatial force function according to which the first and second magnetic field emission structures 1200a and 1200b are configured is selected such that the peak spatial attracting force 1210 generated provides a resisting load to any torque occurring at the axis of rotation 1107. Consequently, when the two halves 1105 and 1106 are complementarily aligned, as shown in FIGS. 12C and 12D, and the peak spatial attracting force 1210 is strongest, the breakaway device 1103 maintains object 1100 in position relative to object 1101, until a force sufficient to overcome the peak spatial attracting force 1210 occurs at the axis of rotation 1107. It will be noted that second half 1106 is attached to object 1100 such that when object 1100 is in its initial position relative to object 1101 (FIG. 11A-11C), then the first and second magnetic field emission structures 1200*a* and 1200*b* are in a complementary alignment.

When force F acts on the object 1100, torque is generated about the axis 1107, and is, thus, applied to the breakaway device 1103. Accordingly, if the torque is sufficient, the second half 1106 comprising the second magnetic field emission structure 1200*b* rotates relative to the first half 1105 comprising the first magnetic field emission structure 1200*a*. As the second half 1106 rotates, the spatial attracting force 1210 between the first half 1105 and the second half 1106 of the breakaway device 1103 weakens. The two halves 1105 and 1106 of the breakaway device 1103 disengage, the object 1100 is free to pivot relative to stationary object 1101 in the direction shown by the reference line 1109.

In addition, the breakaway device 1103 may include a handle 1206 (turning mechanism)(see FIG. 12C). The handle 1206 is depicted as associated with the second half 1106, however, it may be on either half, or both. The handle 1206 attaches to the half's corresponding field emission structure, for example the field emission structure 1200*b* corresponding to the second half 1106. When the user manually turns the handle 1206, the field emission structure 1200*b* rotates, thus weakening the spatial attracting force between the magnetic field emissions structures 1200*a* and 1200*b* so that the halves 1105 and 1106 can be manually separated.

Figure 13:
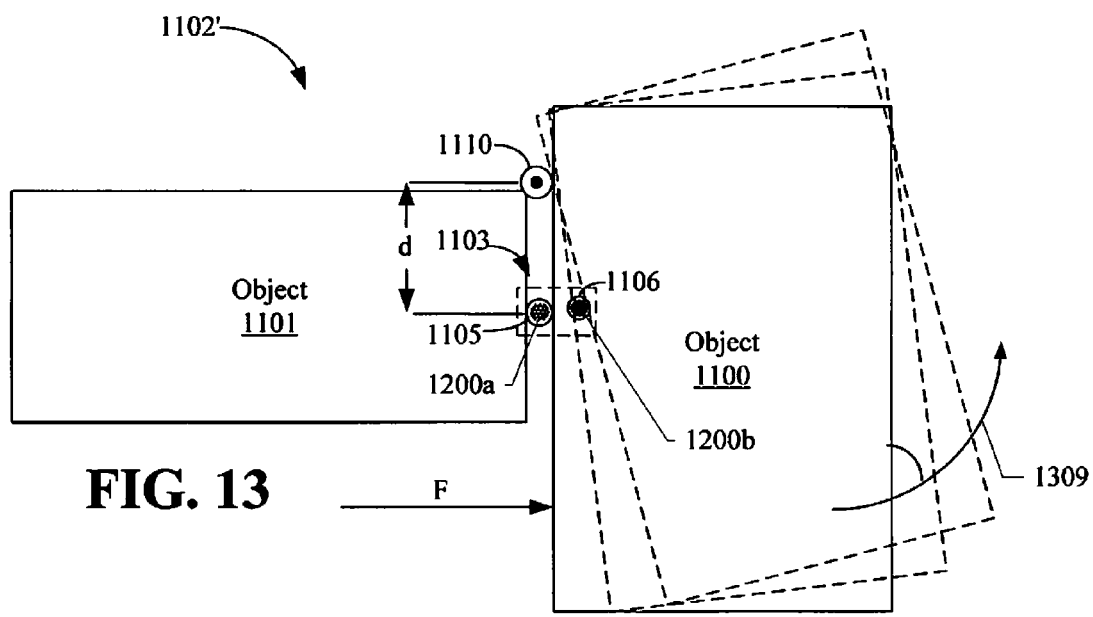
FIG. 13 depicts a variant of the apparatus shown in FIGS. 11A-11C in accordance with another embodiment of the present invention.

FIG. 13 depicts a side view of an apparatus 1102' which is a variation of the apparatus 1102 described with reference to FIGS. 11-12 in accordance with an embodiment of the present invention. Again, first object 1100 is hingedly coupled to a second object 1101. The apparatus 1102' also includes a breakaway device 1103, which, again further comprises first and second complementary magnetic field emission structures 1200*a* and 1200*b*. In this regard, apparatus 1102' is similar to the apparatus 1102 depicted in FIGS. 11-12, however, the breakaway device 1103 is mounted a distance d from the hinge 1110. In other words, the breakaway device 1103 is not mounted co-axially with the axis of rotation of the hinge 1110.

Again, when a force F acting on the object 1100 is less than some threshold value, the object 1100 is substantially locked with respect to the object 1101 by the breakaway device 1103. If a force F having a value greater than the threshold value acts upon the object 1100, and upon the breakaway device 1103, then the magnetic field emission structures 1200*a* and 1200*b* become misaligned, reducing the spatial attracting force and disengaging the breakaway device 1103. The object 1100 moves upward and in a direction that follows the arc reference line 1309. Movement of the object 1100 with respect to the object 1101 is illustrated by the dotted lines outlining the object 1100 as it moves in response to the force F which exceeds the threshold value.

FIGS. 14A-14E depict yet another exemplary application wherein a boat 1400 moving in a direction indicated by reference arrow 1411 includes an outboard motor 1401 attached to the stern of the boat 1400 via a hinged mounting bracket 1402 defining a pivot point 1413 which lies along an axis of rotation 1420 for the hinged mounting bracket 1402. Thus, the outboard motor 1401 can be raised from and lowered into water 1412 rotated about the axis of rotation 1420.

The outboard motor 1401 may be any conventional motor suitable for propelling such a craft on the surface of the water 1412 and may comprise a powerhead 1405, that houses an engine (not shown), which is coupled to an exhaust housing 1406. The exhaust housing 1406 is coupled to a lower gearbox unit 1410, that comprises a propeller 1407 and a skeg 1408.

Figure 14A:
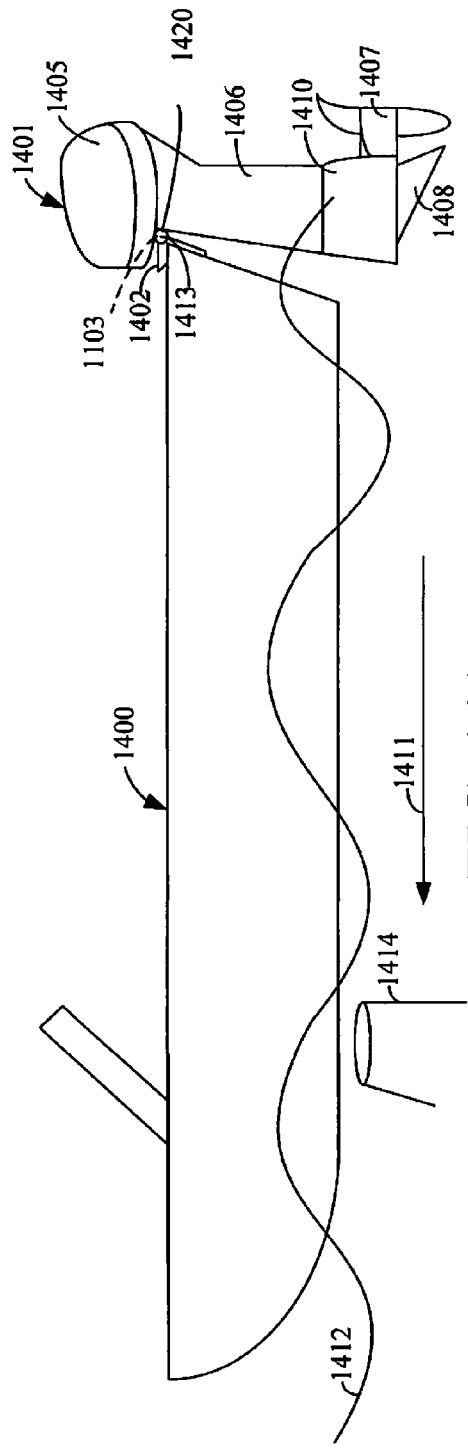
FIGS. 14A-14E depicts a boat having an outboard motor connected thereto by the breakaway device shown in FIGS. 12A-12D in accordance with another embodiment of the present invention.
Figure 14B:
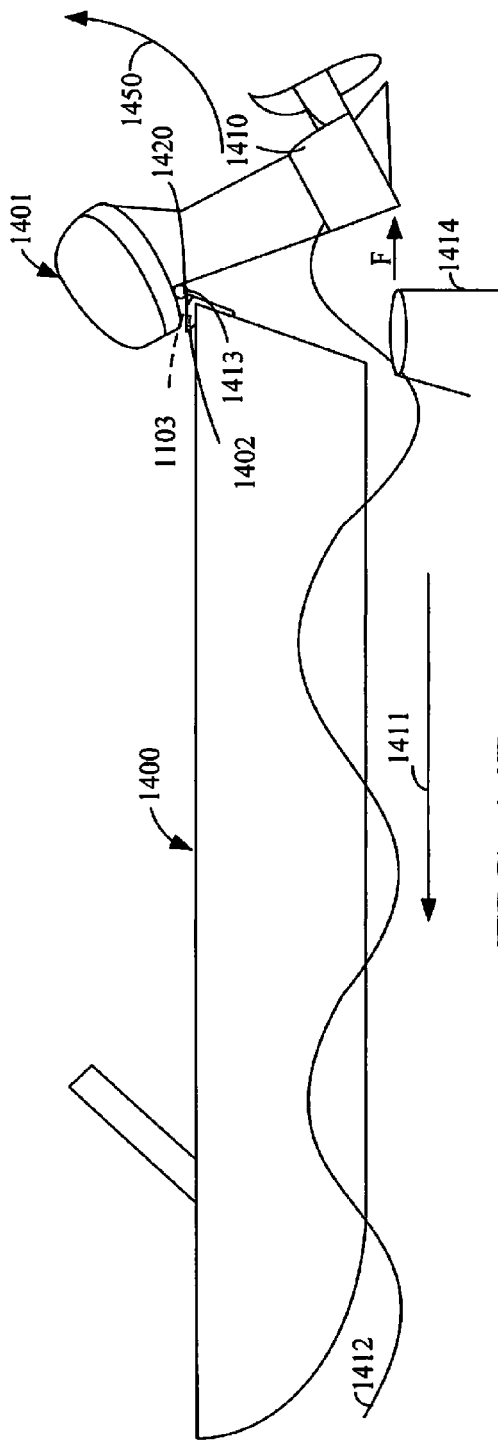
Figure 14D:
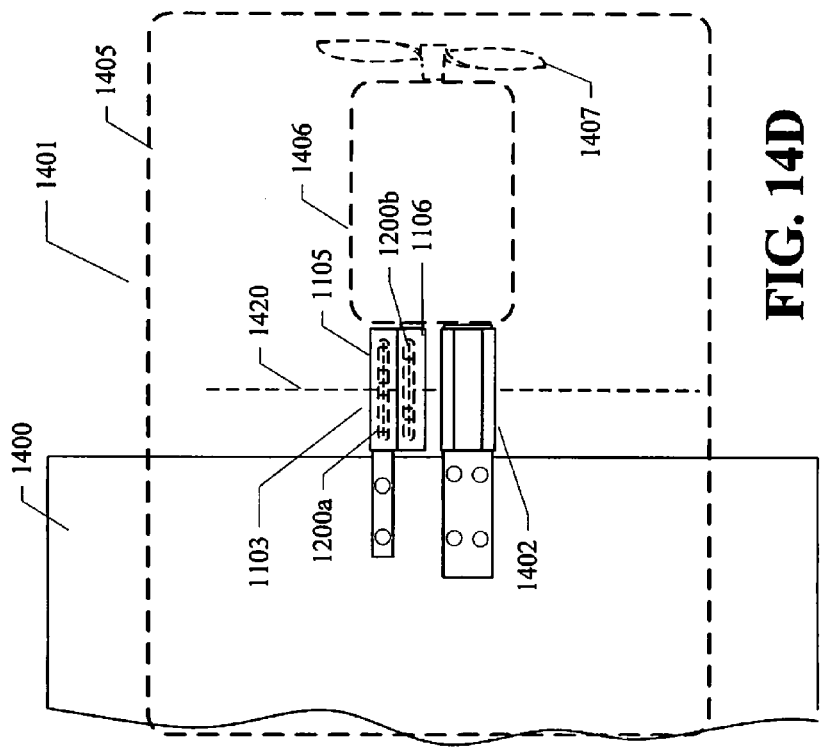
Figure 14C:
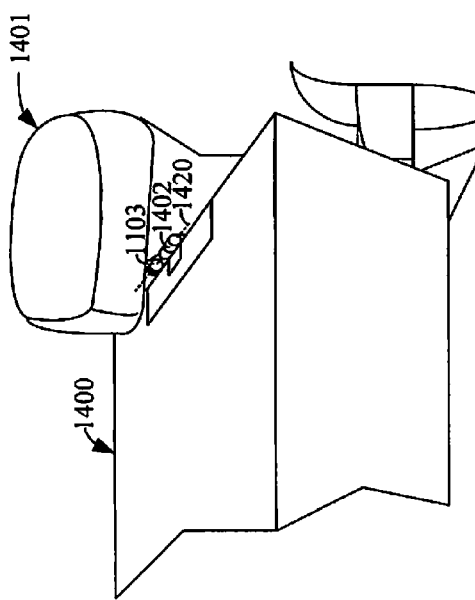
Figure 14E:
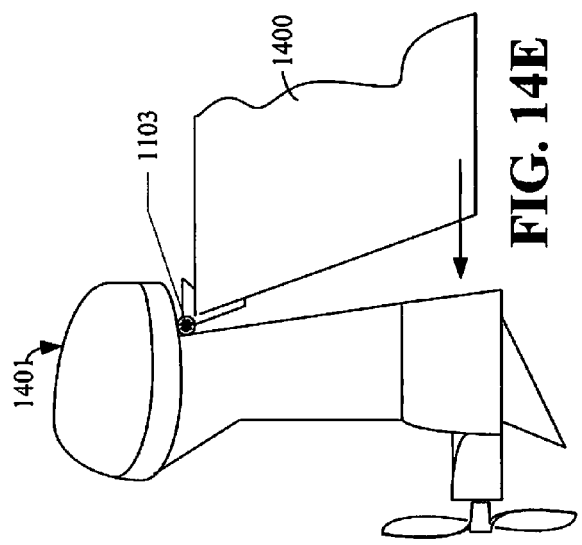

As shown in FIG. 14C, the boat 1400 further includes a breakaway device 1103, described above with reference to FIGS. 11-12, located on the axis of rotation 1420, having a first half and a second half 1105 and 1106 attached respectively, to the boat 1400 and the motor 1401. Each half 1105 and 1106 including a mutually complementary magnetic field emission structure 1200*a* and 1200*b* as shown and described above. FIG. 14D is a top-down view of the outboard motor 1401, (the power head 1405, the exhaust housing 1406, and propeller 1407 all shown in dashed line) attached as described to the stern of the boat 1400. When the outboard motor 1401 is lowered, the breakaway device 1103 locks the outboard motor 1401 in the lowered position, as shown in FIG. 14E. The term "lowered position" refers to that position of the outboard motor 1401 when the skeg 1408 and the propeller 1407 are submerged in the water 1411, shown in FIG. 14A.

As the boat 1400 moves forward, the water 1412 may have debris in it. For example, there may be garbage floating on top of the water 1412. As another example, the boat 1400 may encounter a submerged object 1414, which may be a stump, a log, or other similar debris (see FIG. 14A). With reference to FIG. 14B, as the boat 1400 moves in the direction indicated by the reference arrow 1411, the gearbox 1410 may strike the object 1414. When the gearbox 1410 strikes the object 1414, a force F is exerted on the outboard motor 1401 in the direction shown. The force F applied to the outboard motor 1401 creates a torque force in the breakaway device 1103. If the torque force applied to the breakaway device 1103 exceeds a particular threshold, the magnetic field emission structure pair 1200*a* and 1200*b* is brought out of rotational alignment disengaging the breakaway device 1103 such that the outboard motor 1401 can move in a pivoting direction indicated by the reference arrow 1450.

Figure 15:
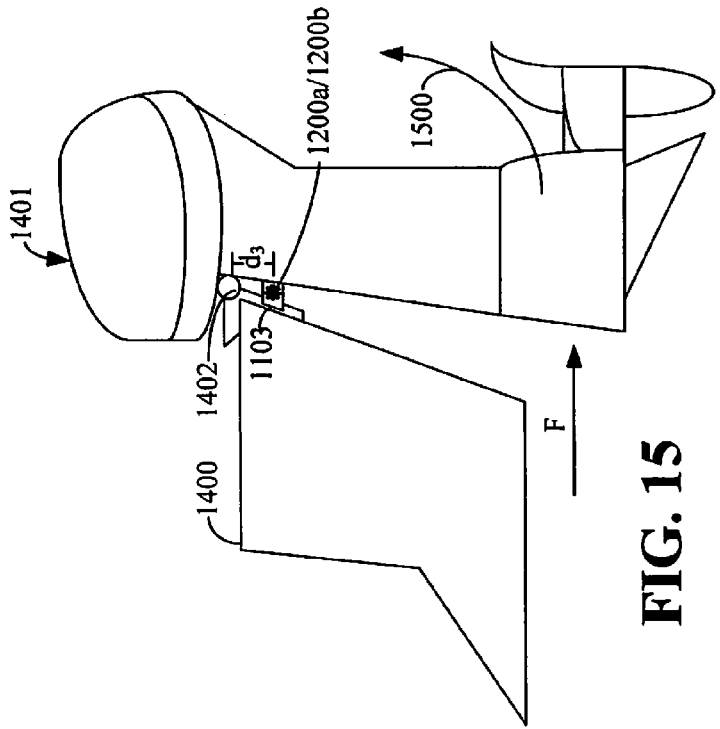
FIG. 15 depicts a variant of the boat shown in FIGS. 14A-14E in accordance with another embodiment of the present invention.

FIG. 15 depicts a variation on the embodiment described in FIGS. 14A-E wherein the breakaway device 1103 is mounted a distance d3 from the axis of rotation of the hinged mounting plate 1402. The breakaway device 1103 comprises a magnetic field emission structure pair 1200*a* and 1200*b*. One of the magnetic field emission structures 1200*a* is mounted to the boat 1400 whereas the other magnetic field structure 1200*b* is mounted to the outboard motor 1401. Such mounting is similar to the mounting of the magnetic field emission structures 1200*a* and 1200*b* described with reference to FIGS. 11-12.

When a force F is applied to the outboard motor 1401 and the force F exceeds the threshold value, the force F causes torque and shear forces on the magnetic field emission structure pair 1200*a* and 1200*b* such that the magnetic field emission structures rotationally misalign. When the magnetic field emission structure pair 1200*a* and 1200*b* misaligns, then the lock between the boat 1400 and the outboard motor 1401 is weakened and the outboard motor 1401 rotates about the hinge 1402 moving in a direction indicated by arc reference line 1500.

Figure 16:
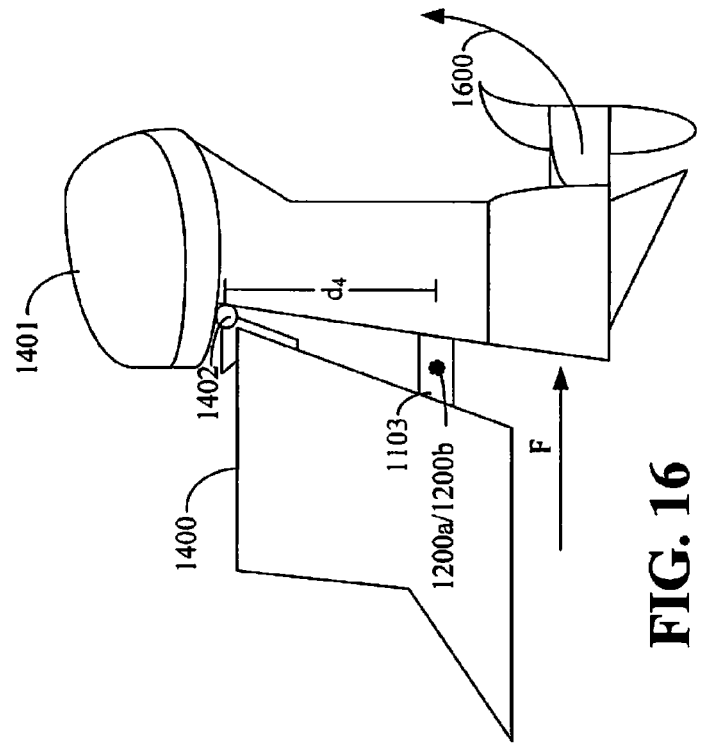
FIG. 16 depicts another variant of the boat shown in FIGS. 14A-14E in accordance with another embodiment of the present invention.

FIG. 16 depicts yet another embodiment of the present disclosure varying slightly from that depicted in FIG. 15. In this version, breakaway device 1103 is mounted a distance $d_4$ from a hinge 1402. The breakaway device 1103 comprises a magnetic field emission structure pair 1200*a* and 1200*b*, as described above. One of the magnetic field emission structures 1200*a* is mounted to the boat 1400 whereas the other magnetic field structure 1200*b* is mounted to the outboard motor 1401. Such mounting is similar to the mounting of the magnetic field emission structures 1200*a* and 1200*b* described with reference to FIGS. 11-12. Again, when a force F is applied to the outboard motor 1401 as indicated and the force F is large enough so that the magnetic field emission structures 1200*a* and 1200*b* misalign, then the lock between the boat 1400 and the outboard motor 1401 by the magnetic field emission structure pair 1200*a* and 1200*b* is weakened and the outboard motor 1401 rotates about the hinge 1402 so that the outboard motor 1401 moves in a direction indicated by arc reference line 1600.

Figure 17A:
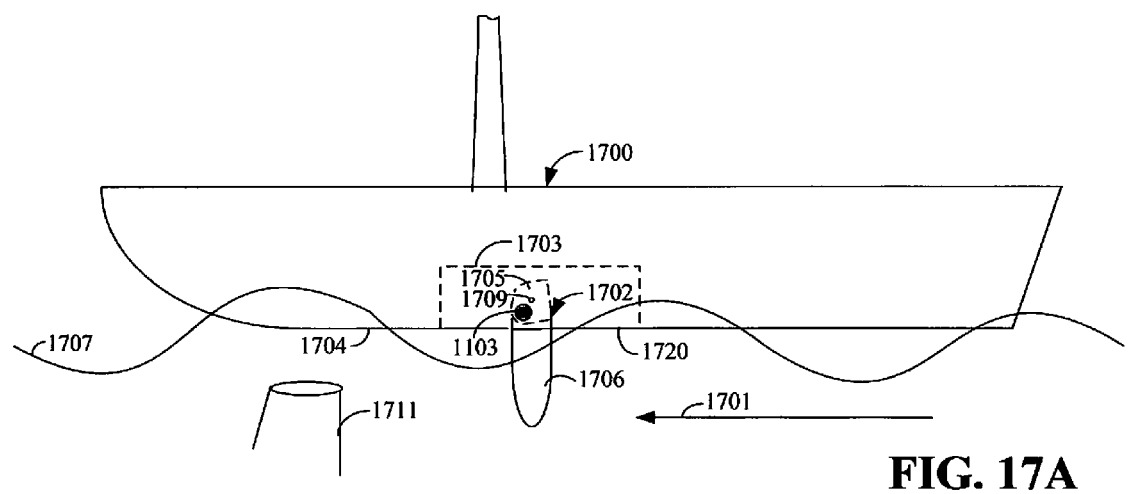
FIGS. 17A-17C depicts a sailboat having a centerboard assembly that includes the breakaway device shown in FIGS. 12A-12D in accordance with another embodiment of the present invention.
Figure 17B:
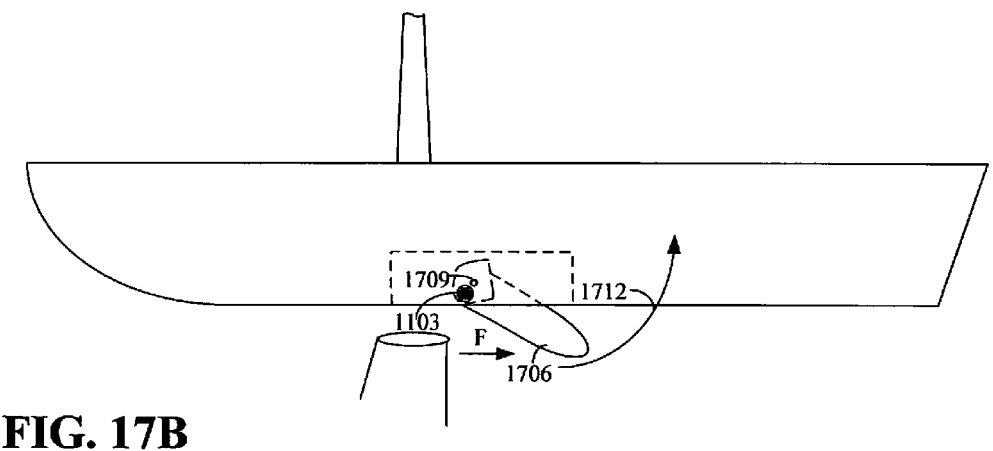
Figure 17C:
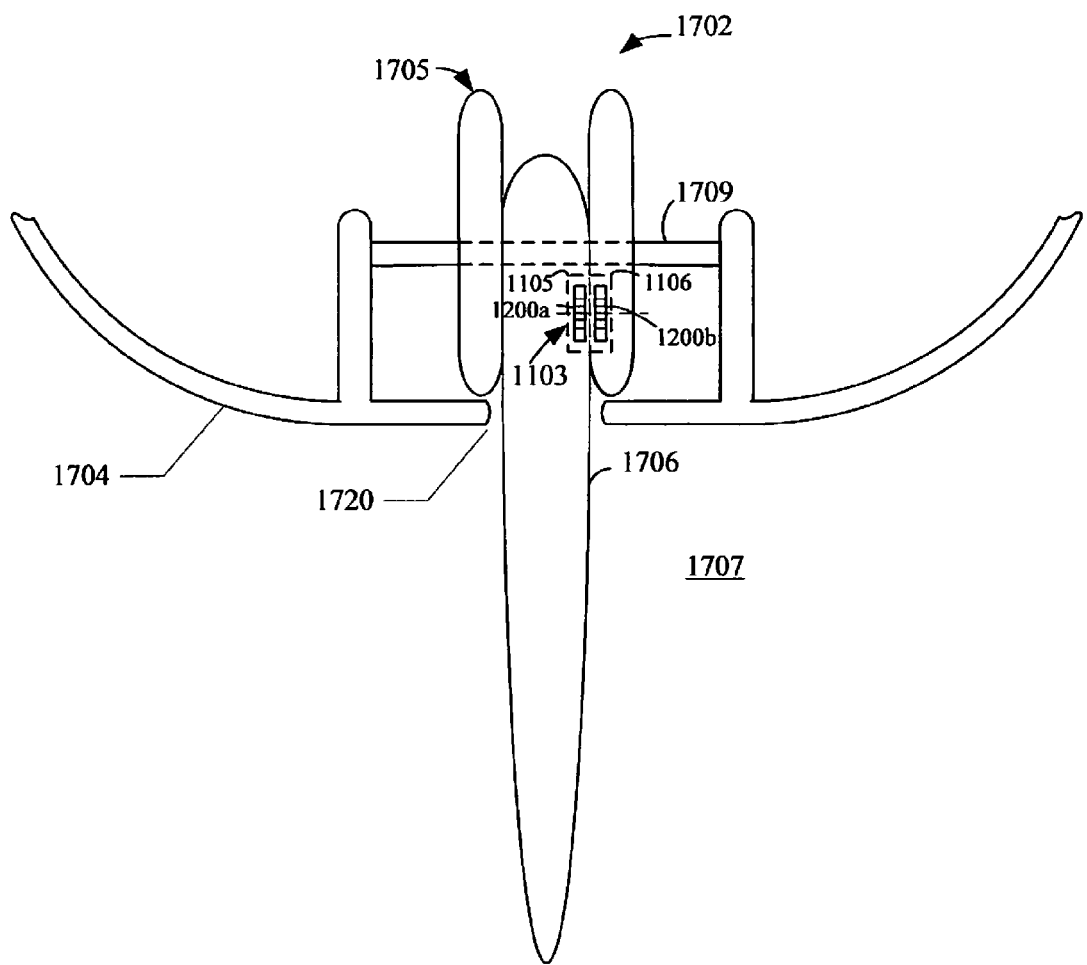

FIGS. 17A-17C depict a sailboat 1700, moving in a direction indicated by reference arrow 1701, which includes a further application of magnetic field emission structures. The sailboat 1700 is equipped with a retractable centerboard assembly 1702. The centerboard assembly 1702 is attached to the boat 1700 within a space 1703 in a hull 1704 of the boat 1700.

The centerboard assembly 1702 comprises an upper portion 1705 fixedly mounted to the interior hull of the boat 1700 comprising two stanchions supporting a pin 1709. A centerboard 1706 is mounted to the pin 1709 allowing it to pivot about an axis of rotation defined by the pin 1709. As can be seen more clearly in FIG. 17C, the centerboard 1706 can be lowered into the water 1707 extending through an opening 1720 in the bottom of the hull 1704. The centerboard assembly 1702 also comprises a breakaway device 1103. The breakaway device 1103 comprises a first half 1105 which includes a first magnetic field emission structure 1200*a* configured as described above, and a second half 1106 which includes a second magnetic field emission structure 1200*b* complementary to the first field emission structure 1200*a*. The second half 1106 is embedded within the fixed upper portion 1705 on or in an inner surface 1722 of the upper portion 1705 adjacent the upper part of the centerboard 1706. The first half 1105 is located on or in the surface of the centerboard 1706 opposing the inner surface 1722 of the upper portion 1705, and positioned such that when the centerboard 1706 is in the extended position, the first and second halfs 1105 and 1106 are complementarily aligned. When the centerboard 1706 is extended into the water 1707, the breakaway device 1103 locks the centerboard 1706 in an extended position, as shown in FIG. 17A. Those skilled in the art will recognize that a daggerboard, which is a member that may be extended beneath a boat vertically rather than pivoted, may also be configured with a breakaway device 1103 in a similar manner.

The boat 1700 may travel in a direction indicated by reference arrow 1701 shown in FIG. 17A with a motor (not shown) or sails (not shown) the boat 1700 may encounter an object 1711 in the water 1707, which may be a stump, a log, or free-floating debris. When the centerboard 1706 strikes the stump 1711, a force F is exerted on the centerboard 1706 in the direction shown. The force F applied to the pivoting centerboard 1706 creates a torque force and/or a shear force in the breakaway device 1103. If the force applied to the breakaway device 1103 exceeds the force required to misalign the first and second magnetic field emission structures 1200*a* and 1200*b*, either through torque or shear, the peak attracting force coupling the structures to each other is diminished, decoupling the breakaway device 1103. The centerboard 1706 is then allowed to rotate about pivot point 1709 in the direction indicated by the reference arrow 1712.

A further application of magnetic field emission structures is illustrated in FIGS. 18A through 18C where a sailboat 1800 includes an exemplary rudder assembly 1802 attached by a conventional swivel 1801 to the stern 1807 of the boat. The rudder assembly 1802 includes a support assembly 1804 which comprises at least one plate member 1805. The plate member 1805 provides a mounting support for a rudder 1806 which is pivotally connected to the support structure by a pin 1809 which defines an axis of rotation. The rudder assembly 1802 also comprises a breakaway device 1103. The breakaway device 1103 comprises a first half 1105 which includes a first magnetic field emission structure 1200*a*, and a second half 1106 which includes a second magnetic field emission structure 1200*b* complementary to the first field emission structure 1200*a*. The second half 1106 is embedded within plate member 1805 on or in an inner surface of the plate member 1805 adjacent the upper part of the rudder 1806. The first half 1105 is located on or in the surface of the rudder 1806 opposing the inner surface of the plate member 1805, and positioned such that when the rudder 1806 is in the extended position, the first and second magnetic field emission structures 1200*a* and 1200*b* are complementarily aligned and the peak attracting force between the two structures is generated. When the rudder 1806 is extended into the water 1814, the breakaway device 1103 locks the rudder 1806 in an extended position.

As the boat 1800 travels through the water 1814, if the boat encounters a stump 1816, or other debris, and if the force generated by the impact is sufficient, then the magnetic field emission structures 1200*a* and 1200*b* in the breakaway device 1103 will become misaligned. The peak spatial attracting force will be diminished, disengaging the breakaway device 1103. The rudder 1806 will then be allowed to pivot afterward, thereby reducing or eliminating the risk of damage to the rudder 1806 and rudder assembly 1802.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

The invention claimed is:

1. A breakaway system for attaching and detaching two objects, comprising:
    a first magnetic field structure attached to a first object; and
    a second magnetic field structure attached to a second object, said first magnetic field structure attaching to the second magnetic field structure when substantially aligned, said first magnetic field structure and the second magnetic field structure becoming detached when subjected to a breakaway force that overcomes a spatial force between the first magnetic field structure and the second magnetic field structure, said first magnetic field structure having first magnetic field sources, and said second magnetic field structure having second magnetic field sources, said first magnetic field sources and said second magnetic field sources having polarities and positions in accordance with a code corresponding to a spatial force function, wherein said spatial force function is in accordance with the code, said code corresponding to a code modulo of said first magnetic field sources and a complementary code modulo of second magnetic field sources, said code defining a peak spatial force corresponding to substantial alignment of the code modulo of the first magnetic field sources with the complementary code modulo of the second magnetic field sources, said code also defining a plurality of off peak spatial forces corresponding to a plurality of different misalignments of the code modulo of the first magnetic field sources and the complementary code modulo of the second magnetic field sources, said plurality of off peak spatial forces have a largest off peak spatial force, said largest off peak spatial force being less than half of the peak spatial force.

2. The breakaway system of claim 1, wherein said breakaway force is greater than a threshold value.

3. The breakaway system of claim 1, wherein said code is one of a pseudorandom code, a deterministic code, or a designed code.

4. The breakaway system of claim 1, wherein said code is one of a one dimensional code, a two dimensional code, a three dimensional code, or a four dimensional code.

5. The breakaway system of claim 1, wherein said code is one of a Barker code, a Gold code, a Kasami sequence, a hyperbolic congruential code, a quadratic congruential code, a linear congruential code, a Welch-Costas array code, a Golomb-Costas array code, a pseudorandom code, a chaotic codes, or an Optimal Golomb Ruler code.

6. The breakaway system of claim 1, further comprising at least one of a turning mechanism, a tool insertion slot, an alignment mark, a latch mechanism, a pivot mechanism, a swivel mechanism, or a lever.

7. The breakaway system of claim 1, wherein said first object is a boat and said second object is one of a motor, a centerboard assembly, or a rudder.

8. The breakaway system of claim 1, wherein said breakaway force corresponds to at least one of a torque or a shear force.

9. The breakaway system of claim 1, wherein said threshold is established to reduce or eliminate the risk of damage to at least one of said first object or said second object.

10. A method for attaching and detaching two objects, comprising the steps of:
attaching a first magnetic field structure to a first object; and
attaching a second magnetic field structure to a second object, said first magnetic field structure attaching to the second magnetic field structure when substantially aligned, said first magnetic field structure and the second magnetic field structure becoming detached when subjected to a breakaway force that overcomes a spatial force between the first magnetic field structure and the second magnetic field structure, said first magnetic field structure having first magnetic field sources, and said second magnetic field structure having second magnetic field sources, said first magnetic field sources and said second magnetic field sources having polarities and positions in accordance with a code corresponding to a spatial force function, wherein said spatial force function is in accordance with the code, said code corresponding to a code modulo of said first magnetic field sources and a complementary code modulo of second magnetic field sources, said code defining a peak spatial force corresponding to substantial alignment of the code modulo of the first magnetic field sources with the complementary code modulo of the second magnetic field sources, said code also defining a plurality of off peak spatial forces corresponding to a plurality of different misalignments of the code modulo of the first magnetic field sources and the complementary code modulo of the second magnetic field sources, said plurality of off peak spatial forces have a largest off peak spatial force, said largest off peak spatial force being less than half of the peak spatial force.

11. The method of claim 10, wherein said breakaway force is greater than a threshold value.

12. The method of claim 10, wherein said code is one of a pseudorandom code, a deterministic code, or a designed code.

13. The method of claim 10, wherein said code is one of a one dimensional code, a two dimensional code, a three dimensional code, or a four dimensional code.

14. The method of claim 10, wherein said code is one of a Barker code, a Gold code, a Kasami sequence, a hyperbolic congruential code, a quadratic congruential code, a linear congruential code, a Welch-Costas array code, a Golomb-Costas array code, a pseudorandom code, a chaotic codes, or an Optimal Golomb Ruler code.

15. The method of claim 10, wherein said first object is a boat and said second object is one of a motor, a centerboard assembly, or a rudder.

16. The method of claim 10, wherein said breakaway force corresponds to at least one of a torque or a shear force.

17. The method of claim 10, wherein said threshold is established to reduce or eliminate the risk of damage to at least one of said first object or said second object.

18. A system for reducing damage to a first object attached to a second object, comprising:
associating a first field emission structure with said first object, said first field emission structure having first field emission sources; and
associating a second field emission structure with said second object, said second field emission structure having second field emission sources, said first field emission structure attaching to the second field emission structure when said first field emission sources and said second field emission sources are substantially aligned, said first field emission structure and the second field emission structure becoming detached when subjected to a breakaway force that overcomes a spatial force between the first field emission structure and the second field emission structure, said first field emission sources and said second field emission sources having polarities and positions in accordance with a code corresponding to a spatial force function, wherein said spatial force function is in accordance with the code, said code corresponding to a code modulo of said first field emission sources and a complementary code modulo of second field emission sources, said code defining a peak spatial force corresponding to substantial alignment of the code modulo of the first field emission sources with the complementary code modulo of the second field emission sources, said code also defining a plurality of off peak spatial forces corresponding to a plurality of different misalignments of the code modulo of the first field emission sources and the complementary code modulo of the second field emission sources, said plurality of off peak spatial forces have a largest off peak spatial force, said largest off peak spatial force being less than half of the peak spatial force.

* * * * *